(12) United States Patent
Chhabra

(10) Patent No.: US 10,303,612 B2
(45) Date of Patent: May 28, 2019

(54) POWER AND PERFORMANCE-EFFICIENT CACHE DESIGN FOR A MEMORY ENCRYPTION ENGINE

(71) Applicant: Intel Corporation, Santa Clara, CA (US)

(72) Inventor: Siddhartha Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 15/396,190

(22) Filed: Dec. 30, 2016

(65) Prior Publication Data

US 2018/0189186 A1 Jul. 5, 2018

(51) Int. Cl.
*G06F 12/14* (2006.01)
*G06F 21/00* (2013.01)
*G06F 21/72* (2013.01)
*G06F 12/122* (2016.01)
*G06F 12/123* (2016.01)
*G06F 12/0875* (2016.01)

(52) U.S. Cl.
CPC ........ *G06F 12/0875* (2013.01); *G06F 12/122* (2013.01); *G06F 12/123* (2013.01); *G06F 12/1408* (2013.01); *G06F 21/00* (2013.01); *G06F 21/72* (2013.01); *G06F 2212/402* (2013.01); *Y02D 10/13* (2018.01)

(58) Field of Classification Search
None
See application file for complete search history.

(56) References Cited

U.S. PATENT DOCUMENTS

| | | | | |
|---|---|---|---|---|
| 5,493,663 A | * | 2/1996 | Parikh | G06F 12/123 711/159 |
| 7,133,975 B1 | * | 11/2006 | Isaac | G06F 12/0811 711/141 |
| 2004/0210320 A1 | * | 10/2004 | Pandya | H04L 29/06 700/1 |
| 2005/0144388 A1 | * | 6/2005 | Newburn | G06F 12/0802 711/118 |
| 2006/0080553 A1 | * | 4/2006 | Hall | G06F 12/0875 713/189 |

(Continued)

*Primary Examiner* — Michael Alsip
*Assistant Examiner* — Ralph A Verderamo, III
(74) *Attorney, Agent, or Firm* — Thorpe North & Western, LLP

(57) ABSTRACT

Apparatuses, systems, and methods for hardware-level data encryption having integrity and replay protection are described. An example electronic device includes a memory encryption engine (MEE) having a MEE cache configured to store a plurality of MEE cache lines, each MEE cache line comprising a plurality of cryptographic metadata blocks, where each metadata block is associated with each of a plurality of encrypted data lines stored in a memory, and each MEE cache line includes a bit vector mapped to the plurality of metadata blocks, where a set bit in the bit vector indicates that the associated metadata block has been accessed by one or more processors, and MEE circuitry configured to select a replacement candidate from the plurality of MEE cache lines for eviction from the MEE cache based on a number of accessed metadata blocks in the replacement candidate as indicated by the associated bit vector.

26 Claims, 7 Drawing Sheets

(56) References Cited

U.S. PATENT DOCUMENTS

| | | | |
|---|---|---|---|
| 2007/0136530 A1* | 6/2007 | Tanaka | G06F 12/0842 711/128 |
| 2008/0104375 A1* | 5/2008 | Hansen | G06F 9/4484 712/220 |
| 2010/0235579 A1* | 9/2010 | Biles | G06F 12/0862 711/125 |
| 2015/0212951 A1* | 7/2015 | Franceschini | G06F 12/1408 713/189 |
| 2016/0026579 A1* | 1/2016 | Samanta | G06F 12/0893 711/136 |
| 2016/0350232 A1* | 12/2016 | Knies | G06F 12/0888 |
| 2017/0068621 A1* | 3/2017 | Watanabe | G06F 12/0891 |

* cited by examiner

POWER AND PERFORMANCE-EFFICIENT CACHE DESIGN FOR A MEMORY ENCRYPTION ENGINE

BACKGROUND

The security of portions of memory in a computing system can be important for the protection of sensitive data from both hardware and software attacks. Confidentiality can be achieved by ensuring that the sensitive data is stored as encrypted data in a secure region of memory when resident in platform memory. In order to provide complete protection, however, a protection scheme needs to provide integrity-protection and replay-protection for the encrypted data. In the absence of such protections, an attacker with physical access to the system can record snapshots of encrypted data cache lines and replay them at a later point in time to overcome the encryption scheme.

DESCRIPTION OF EMBODIMENTS

Figure 1:
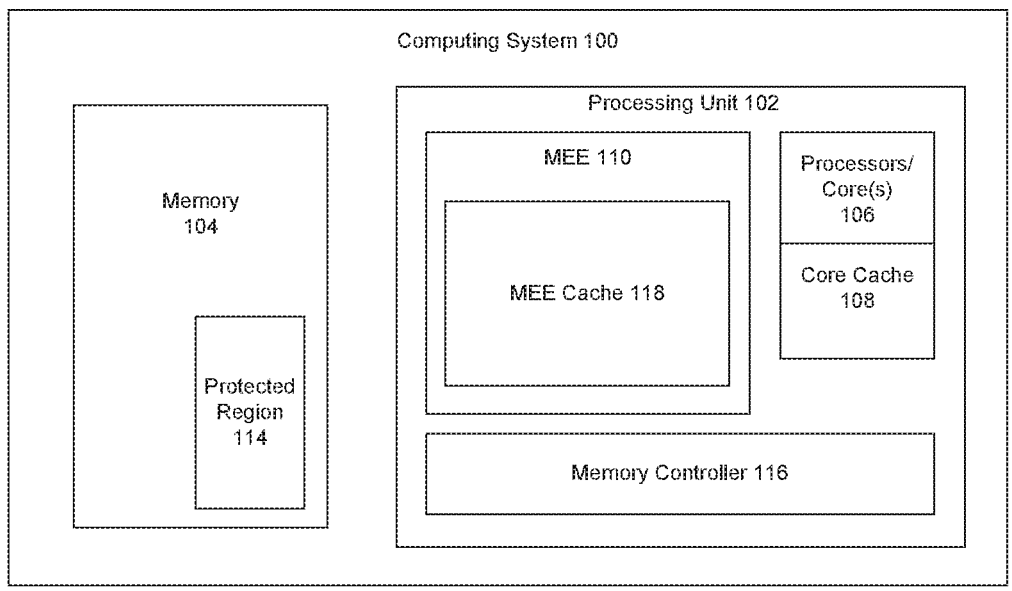
FIG. 1 is a block diagram of a computing system in accordance with an example embodiment.

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

The present disclosure provides a data protection technology having data confidentiality, integrity confidentiality, and replay confidentiality, that is implemented using a memory encryption engine (MEE) that incorporates a novel MEE cache that is power- and performance-efficient. The security of data is an important consideration in any computing system that stores sensitive data and is vulnerable to hacking attacks. In order to provide such data security, a system needs to provide data confidentiality, integrity confidentiality, and replay confidentiality. In one example, the MEE includes two cryptographic mechanisms, encryption and integrity/replay protection, which are designed to defend against passive and active attacks, respectively.

Data confidentiality can be achieved via memory encryption, which is primarily designed to protect against a class of hardware attacks, so called "passive attacks," where the attacker tries to discretely observe data as it moves in and out of the processor or processor unit. In order to defend against these types of attacks, the MEE can employ encryption to a protected region of the main memory. In essence, a line of data (i.e. "a data line") is encrypted on-chip by the MEE before being sent from the processor to the protected region. In response to a read request from the processor to the protected region, the data line is first received by the MEE and decrypted, prior to being sent to the processor. Numerous data encryption technologies are known, and any such technology can be used to encrypt data under the present scope. In some examples, the encryption and decryption algorithms can be selected for use based on the desired level of data security for a given computing system. As used herein, in one example, the term "data line" refers to a unit of data having a size of any granularity that is capable of being stored in memory and utilized by a processor.

While data encryption can protect against passive attacks, it does not protect against integrity and replay attacks, where an attacker can replay an older snapshot of the data to thwart the data encryption. In order to defend against integrity attacks, for example, a memory authentication mechanism is used, which can involve associating a verification code with a ciphertext of the data (i.e. encrypted data) as it moves off the processor chip. When loading the ciphertext from memory, the associated verification code is loaded and verified. If an attempt has been made to change the verification code or the ciphertext, such as by an attacker, the verification will fail. While this scheme protects against integrity attacks, it does not provide protection against replay attacks, in which an attacker replays an older snapshot of data and its associated verification code to thwart the verification. Replay attacks can be protected against, however, by storing the verification codes on the processor chip.

Various MEE techniques can be utilized to protect against attacks on encrypted data, which generally include schemes that cache cryptographic metadata associated with encrypted data lines for verification at the processor. The present disclosure involves a unique MEE cache design that is power- and performance-efficient, and that greatly improves on traditional MEE cache designs. An example computing device for performing such data-protection processing can include at least a processing unit communicatively coupled to a memory, such as a system memory. The processing unit defines a security boundary, and data within this boundary is immune to attack. Once the data leaves the processing unit it becomes susceptible to attack, and security measures can be taken if it is sensitive data before it leaves. The security boundary is defined due to the architecture of the processing unit, which can be confined to a processor die or chip. As such, the processing unit can include any element or structure capable of being incorporated into a processor die, such as, for example, caches, processors, processor cores, memory units, integrated controllers, and the like. The processing unit can also include a MEE to decrypt ciphertext (i.e., encrypted data line) loaded from the memory, or to encrypt plaintext (i.e., non-encrypted data line) before it leaves the processing unit to be sent to a protected region of the memory.

One nonlimiting example of a computing system for performing memory encryption and decryption operations that provide data confidentiality, integrity confidentiality, and replay confidentiality to sensitive data, is shown in FIG. 1. The computing device 100 can include a processing unit 102 communicatively coupled to a memory 104. In one example, the processing unit 102 is contained on a processor die or chip. The processing unit 102 can include one or more processors and/or processor cores 106, and a core cache 108 to cache data and instructions that are frequently used by the processor core 106. The processor core 106 executes instructions and performs operations on data, which can be moved to and from the memory 104. In some example, the core cache 108 can include various prioritized cache levels, which in one example can include, without limitation, a level 1 (L1), a level 2 (L2), and a level 3 (L3) cache. The processing unit 102 can also include a memory controller 116 to provide data and command communication between the processor core 106 and the memory 104. In some examples, the memory controller can be located off-die, and thus not be included within the definition of a processing unit. In such cases, data and command communications between the processor core and the memory can be directed off-die through the memory controller.

The processing unit 102 also includes a MEE 110 for performing encryption operations on plaintext data lines before they leave the processing unit 102 to be stored in a protected region 114 of the memory 104, and decryption operations on ciphertext data lines arriving at the processing unit 102 from the protected region 114. Additionally, the MEE 110 authenticates incoming ciphertext to ensure integrity confidentiality. The MEE 110 further includes a MEE cache 118 for caching cryptographic metadata associated with ciphertext data lines stored in the protected region 114 of the memory 104.

The memory can comprise any type of memory technology that can be used in a computing system as memory, such as a system memory, including volatile and nonvolatile memory (NVM). Volatile memory, for example, is a storage medium that requires power to maintain the state of data stored by the medium. Exemplary memory can include any combination of random access memory (RAM), such as static random access memory (SRAM), dynamic random access memory (DRAM), synchronous dynamic random access memory (SDRAM), and the like. In some examples, DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org).

NVM is a storage medium that does not require power to maintain the state of data stored by the medium. Nonlimiting examples of NVM can include any or a combination of solid state memory (such as planar or three-dimensional (3D) NAND flash memory, NOR flash memory, or the like), cross point array memory, including 3D cross point memory, phase change memory (PCM), such as chalcogenide PCM, non-volatile dual in-line memory module (NVDIMM), a network attached storage, byte addressable nonvolatile memory, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, spin transfer torque (STT) memory, nanowire memory, electrically erasable programmable read-only memory (EEPROM), magnetic storage memory, write in place non-volatile MRAM (NVM-RAM), and the like. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

As described, a data line that is to be sent to a protected region of memory is encrypted prior to leaving the processing unit. While any form of encryption can be utilized, one nonlimiting example is counter-mode encryption, in which the cryptographic task of encrypting/decrypting a data line is decoupled from the data itself. This can be accomplished by encrypting a seed independent of the data, and which is uniquely associated with each data line. The encrypted seed can be referred to as a pad or CryptoPad, which is used to encrypt and decrypt the data line by XORing the pad with the data line. One nonlimiting example of counter-mode encryption uses the well-known $AES_k$ encryption algorithm to encrypt a seed, which is uniquely associated with each data line but independent of the data. Examples of encryption and decryption operations can be described as follows:

CryptoPad=$AES_k$(Seed);
Encryption=Plaintext XOR CryptoPad;
Decryption=Ciphertext XOR CryptoPad.

To ensure the integrity of the counter-mode encryption, the seed needs to be unique, both spatially and temporarily. Spatial uniqueness can be achieved by using a spatial variable as a component of the seed, such as, for example, the physical address of the data being encrypted (i.e., a data line). Temporal uniqueness, on the other hand, can be achieved by associating a temporal variable as a component of the seed, such as, for example, a per-line counter that is incremented on each writeback of the data line to memory. This writeback counter acts as the version of the data line. In order to decrypt the data, the MEE XORs the ciphertext and the pad to generate the plaintext data line.

For integrity protection, a memory authentication mechanism is employed, which in one example can include associating an integrity check value (ICV) with the ciphertext of the data line as it moves off the processing unit. Any useful ICV can be utilized, and is considered to be nonlimiting. In one example, however, the ICV can be a Message Authentication Code (MAC), which are commonly used in the art. On loading a ciphertext back into the processing unit, its associated ICV is loaded and verified. As such, if an attacker attempts to modify either the ICV or the ciphertext, the verification will fail, thus thwarting the attack.

In order to provide a defense against replay attacks, the replay of a snapshot that passes the ICV verification should not be possible. This can be accomplished by storing the ICVs on the processor unit. This approach is not without drawbacks, however, one of which includes the prohibitively high storage overhead. On way to overcome this storage obstacle is to employ a counter tree-based approach, where counter tree comprises levels of nodes organized in a tree structure over the protected region of the memory. Each counter node in the tree is protected with an IVC. In one example implementation, intermediate tree nodes can be stored in memory, and only the roots of the tree are stored securely on the processor chip. While such an approach can significantly reduce the on-die data storage requirements, it can also result in significant performance overheads, because a data line loaded from memory needs to be verified along a tree branch moving up to the root, a process known as a "tree walk." This verification process increases the number of cryptographic operations, which increases the time it takes to verify and load the data line. In the case of a counter tree using five levels of verification, for example, a single access to the protected memory can result in an additional five memory accesses for fetching the metadata for the different levels.

In order to reduce the memory access overhead, the MEE utilizes a metadata-only cache (MEE cache) that caches counter tree nodes that have been previously authenticated, or rather, the cryptographic metadata associated with each counter tree node. As such, the MEE performs a lookup of the MEE cache for each data access to the protected memory for an authenticated tree node, which terminates the tree walk at that point.

Figure 2:
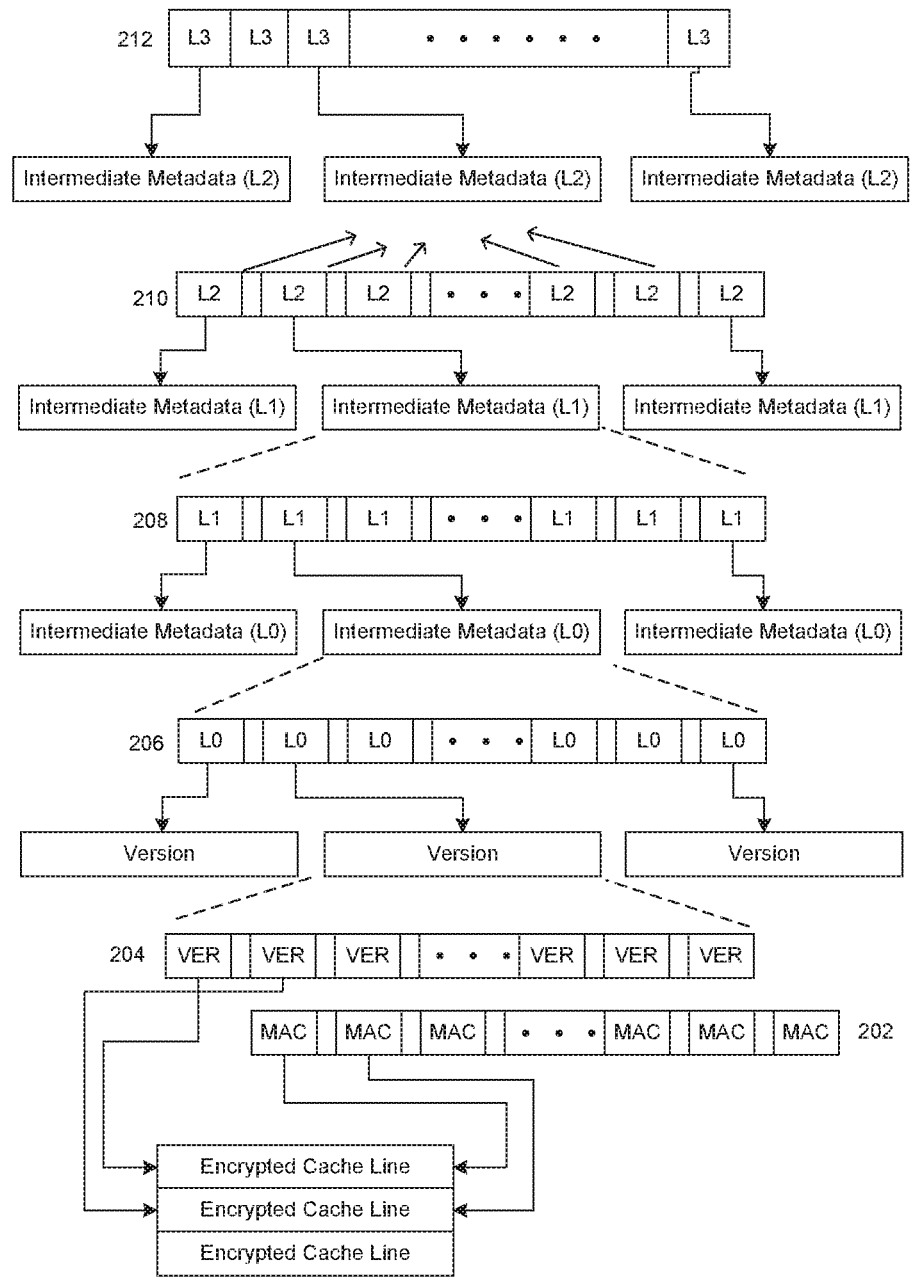
FIG. 2 is a schematic illustration of a counter tree for verification of encrypted data in accordance with an example embodiment.

FIG. 2 shows an example of a high-level counter tree organization that can be used to protect the integrity and ensure replay protection of the data lines in the protected region of the memory. In this example, a MAC is used as the IVC, although any similar IVC scheme can be utilized.

The tree includes MAC nodes 202, version (VER) nodes 204, metadata nodes (L0, L1, L2) 206, 208, 210, and top-level (L3) counters 212. A unique MAC value is associated with each data line stored in the protected region of the memory, and each time a data line is written back to memory, the associated MAC is updated to reflect the most recent data. When a data line is read from memory, the MEE verifies the associated MAC to ensure protection against modification attacks on the data line while it was resident in memory, thus providing integrity protection to the protected region.

The version nodes 204 of the counter tree hold the version of a data line, which is incremented each time the data line is written back to memory. The metadata nodes in the counter tree include counter values and an embedded MAC, computed over the counters stored in the node. For a given metadata node level, a counter from the next higher level in the tree is used as an input to the embedded MAC. For example, a counter in one of the L1 metadata nodes 208 is used as an input to the embedded MAC in one of the lower level L0 metadata nodes 206. This process continues up to the root counters or top-level counters (L3) 212, which are stored securely on the processor die or chip, such as, for example, in static random access memory SRAM. The L3 counters are never evicted off the processor chip, and hence are guaranteed protection against attacks. In essence, the counters at each level in the tree act as versions for the next lower level, ending with the version nodes storing the versions for the data lines. Hence, on a write to a data line, all counters (including the version) and associated embedded MACs along the data line's branches are updated to ensure that the counters along the tree branch reflect the update. In order to ensure replay protection, each time a data line is loaded from the protected region, it is verified for authenticity against the tree nodes up to the root. A mismatch at any level indicates a potential attack and raises a security exception, thereby defeating the attack.

The process of loading the tree nodes along a branch, and verifying the authenticity of each node, is termed a "tree walk." In the case of a write operation, for example, the tree walk is performed to load the tree nodes that need to be updated, and to verify the authenticity of each node as they were resident in the main memory. In case of a read operation, the tree walk also establishes the integrity of the data line to be read. As such, regardless of the type of data operation, an access to the protected region for a data line can result in five additional accesses to memory, one each for loading the MAC, VER, L0, L1, and L2 counter lines. This six-fold increase in memory bandwidth usage can severely impact the performance of the system for MEE accesses. Additionally, even non-MEE memory accesses can be penalized due to the increased memory access of a tree walk. In order to avoid such a high MEE memory access overhead, a local MEE cache is utilized by the MEE to cache tree nodes loaded in prior tree walks that have been previously authenticated. With the MEE cache, a tree walk is thus terminated when the first node along the tree walk is found in the cache (for writes, the cached tree node should be in modified state for the walk to be terminated). A node in the MEE cache terminates the tree walk because the cached node is considered to be secure, as it was verified by a previous data request before being cached, and serves the same purpose as the L3 node on the processor chip.

The MEE cache thus significantly reduces the number of memory accesses required for verifying the authenticity of a data line loaded from the protected region of memory. In some cases, it has been observed that, across a variety of workloads, 85-90% of data accesses to the protected region terminate the tree walk after finding the version and MAC in the MEE cache, and thus do not incur any additional memory accesses for metadata. Overall, the average number of accesses to memory is significantly reduced because of the MEE cache.

Traditional MEE cache implementations employ conventional cache memory design elements, such as utilizing a variant of a LRU replacement policy. This tends to be inefficient, and can result in the provisioning of a much larger cache than is needed for achieving the desired performance of the MEE cache. For example, in some cases, a traditional MEE cache can be 20-25% of the total area of an MEE. One benefit to reducing the MEE area taken up by the MEE cache would be the potential incorporation of MEE technology into small-platform computing devices, such as smart phones, tablets, and the like. Furthermore, reducing the area of the MEE can reduce the power consumption of a system, and thus improve battery life for portable computing devices. For example, various platforms use power gating to power down logic blocks that are not being used. In order to power down a MEE, the MEE cache needs to be flushed so the most updated metadata is in memory. A smaller cache enables a more efficient power-down sequence, thereby resulting in a significant power savings.

Traditional core cache designs, upon which traditional MEE caches have been built, utilize the LRU replacement policy due to the fact that most applications exhibit temporal locality, such that, a data line that was accessed recently is likely to be accessed again in the future, and a data line that has not been accessed recently is not likely to be accessed again. This is largely true, as most applications implement a computation kernel where the main computation for the application is performed. The kernel is implemented as a loop, which accesses the same data repeatedly. Hence, the replacement policy is designed to retain the lines that were accessed recently, and discard lines that have not been accessed recently (i.e., the LRU replacement policy). In other words, the underlying principle of the core cache replacement policy is based on a prediction of which data in the core cache is the most likely to be requested by the processor in the future.

While locality-based replacement designs work reasonably well for the core caching of most applications, the MEE cache is very different from a core cache, where the concept of locality does not apply. For data writes, the MEE encrypts data lines evicted from the core caches before they can be stored in system memory. For data reads, the MEE decrypts and authenticates data lines loaded from the protected region of memory before they are stored in the core caches. Once a given data line is decrypted and stored in the core caches, the metadata lines loaded for that data line in the MEE cache will not be used again, as the data line itself is resident in the core caches. In other words, the purpose of the MEE cache is to cache recently authenticated counter tree nodes to shorten the tree walk. With the associated data line already resident in the core cache, any related counter tree node information in the MEE cache is no longer relevant, as the data line has already been authenticated. Hence, as opposed to conventional core caches, MEE cache lines, once used, should not be used again in the near future. It is because of this fundamental difference in the temporal locality behavior of MEE metadata accesses that a conventional cache design is inefficient for use in the MEE cache.

Each MEE cache line stores metadata for multiple data lines in the protected region of memory. Each metadata chunk corresponding to a data line in the protected region is much smaller in size compared to a commonly-used core cache line size of, for example, 64 bytes. In some MEE examples, each metadata chunk can be 56 bits in size, with 8 metadata chunks in each MEE cache line. As with the LRU replacement policy, using a most recently used (MRU) policy might also not select an optimal candidate for replacement, thus adversely affecting overall performance. For example, a MRU-based MEE cache design can select a MEE cache line with only the one metadata chunk that was recently accessed as the replacement line over a MEE cache line where all of the metadata chunks had been accessed at an earlier time. The line with all of the metadata chunks accessed is a better candidate for replacement, as the all of the data lines corresponding to the metadata chunks are resident in the core caches, ensuring that the MEE cache line will not be used anytime soon.

Accordingly, the present disclosure provides an efficient MEE cache design using novel replacement policies that take into account the unique access behavior of MEE metadata. Any replacement policy that takes into account the unique characteristics of MEE metadata access in a MEE cache is considered to be within the present scope. In one example, a novel Metadata Usage Based (MUB) cache replacement policy can be utilized. MUB enables more efficient MEE metadata caching, and allows for a much smaller cache compared to traditional MEE cache implementations, thus enabling significant area and power savings. More specifically, in one example, a MUB replacement policy will flag a cache line with all metadata chunks accessed as a prime candidate for replacement. In this case, the assumption is that the data lines corresponding to the metadata chunks are already in the core caches, and will not be requested again from memory in the near future. In other words, the purpose for caching the metadata chunks has been accomplished, and there is little to no benefit to maintaining the metadata chunks in the MEE cache. In one example, a MUB algorithm first tries to find an empty line in the MEE cache for the placement of an incoming MEE cache line, and if an empty line cannot be found, it proceeds to looking for a MEE cache line where all the metadata chunks have been accessed, ensuring that such a line is the best candidate for replacement. As such, a MUB replacement candidate is based on the utilization of a cache line, and does not involve the use of temporal characteristics in making the replacement decision.

The metadata cached in the MEE cache is the cryptographic metadata needed for decryption and integrity verification of lines loaded from protected memory. The MEE cache lines each carry the metadata of a number of data lines in the protected region. In some examples, the metadata in a given MEE cache line are from a number of consecutive data lines in the protected region. Due to spatial locality, the processor is likely to fetch consecutive data lines, and grouping the metadata of data lines that are at least from the same spatial locality, if not consecutive, can significantly decrease metadata read latencies. In order for the MEE cache line to be entered into the MEE cache, the metadata associated with the fetched data line is verified by a tree walk. However, as each MEE cache line also includes the metadata from a number of other data lines, these additional metadata chunks need to be verified as well. As such, if the processor fetches any of the data lines having metadata in the MEE cache line, that metadata will already be verified, thus avoiding further memory access. It is much more likely that arranging metadata blocks from consecutive data lines in the same MEE cache line will result in a subsequent MEE cache hit, as opposed to arranging metadata blocks from randomly associated data lines together in the same MEE cache line.

Figure 3:
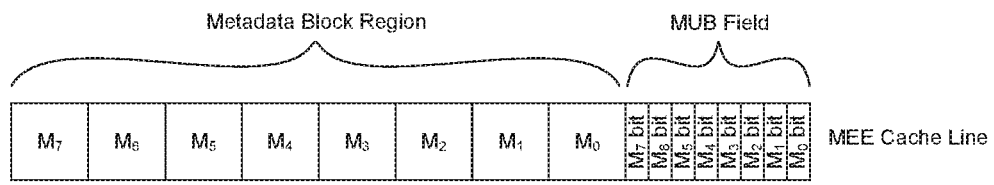
FIG. 3 is a schematic illustration of a MEE cache line in accordance with an example embodiment.

FIG. 3 shows one example of a MEE cache line showing one example implementation of MEE cache line metadata organization. In this nonlimiting example, the MEE cache line includes eight metadata blocks ($M_0$-$M_7$) in a metadata block region, where each metadata block contains the metadata for one of a corresponding set of data lines. This metadata is used to decrypt the data line (i.e., the ciphertext) and to verify its integrity. In order to aid in the replacement decision, the MEE cache line also includes a MUB field, which is a bit vector with one bit per metadata chunk in the corresponding MEE cache line. The MUB field is set when the corresponding metadata chunk is accessed by the MEE. In this manner, the MEE can check the MUB field to determine which metadata blocks have been accessed according to the state of the associated MUB bit. As the MUB field includes 1 bit per metadata chunk, the cache tag size can be increased by 1 bit for each metadata chunk in the MEE cache line. For example, if a cache tag includes 8 metadata chunks, the size of the MUB field will be 8 bits, and the cache tag can be increased in size by 8 bits.

Figure 4:
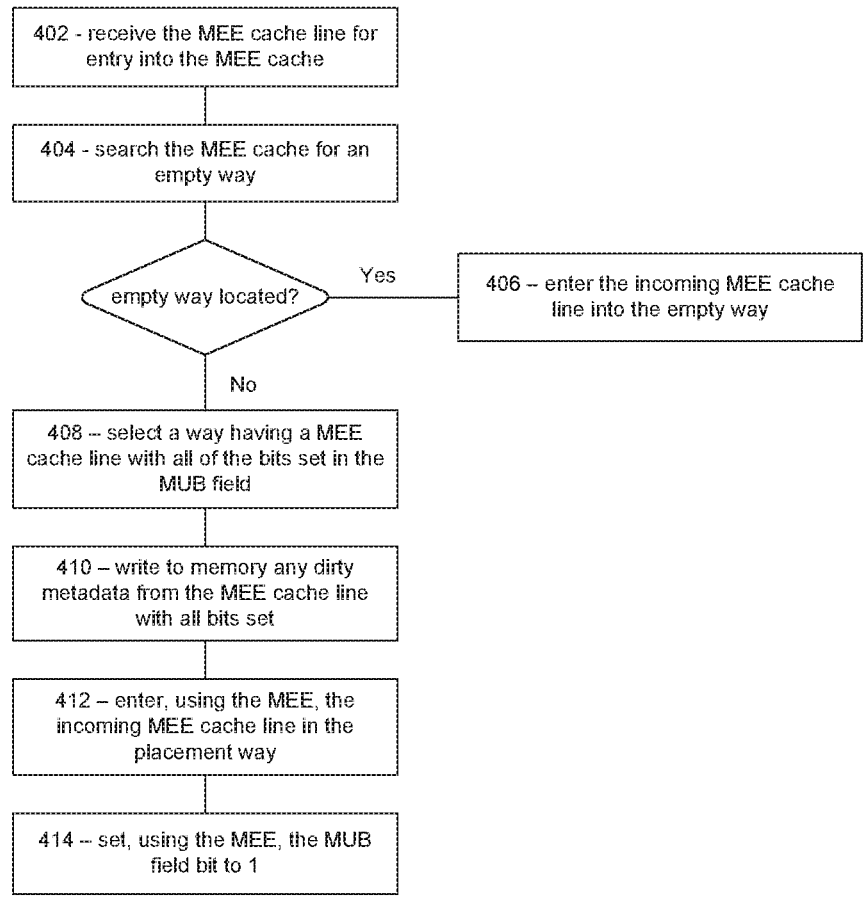
FIG. 4 is a schematic illustration of a MEE cache replacement policy in accordance with an example embodiment.

One example of a flow for entering a MEE cache line into MEE cache according to a MUB replacement policy is shown FIG. 4. Upon verification of an incoming data line (i.e., ciphertext) from the protected region of the memory, the MEE cache 402 receives the incoming MEE cache line containing the metadata of the data line. The MEE performs a 404 search of the MEE cache in order to find an empty way, and if an empty way is found, the incoming MEE cache line is 406 entered into the empty way. If, on the other hand, an empty way is not found, the MEE 408 searches for a way having a MEE cache line with all bits in the MUB field set as a candidate for replacement. A MEE cache line with the all bits set to "1" (i.e., accessed bits) in the MUB bit vector is the best candidate for replacement, as all of the data lines associated with the metadata blocks have been entered into the core caches. The way in which the replacement candidate is stored is designated as the placement way. If the replaced MEE cache line contains any "dirty" metadata, or in other words, any metadata that has been altered while in the MEE cache, 410 the dirty metadata is written back to the memory as part of the protected region. The incoming MEE cache line is 412 written into the placement way, thus replacing the previous MEE cache line (i.e., the replacement candidate). Once the incoming MEE cache line has been written to the placement way, the bit in the MUB field corresponding to the metadata chunk for the incoming MEE cache line 414 is set to 1, indicating that the associated data line has been accessed, and is stored in the core caches.

While a MEE cache line with all bits set to 1 in the MUB bit vector is the best candidate for replacement, it is not guaranteed that there is a way in the MEE cache with a MEE cache line having all bits set. While there are various schemes that can be utilized to address this situation, two options are provided as nonlimiting examples. In one option example, the MEE can select the MEE cache line with the greatest number of set bits in the MUB field as the replacement candidate. Stated another way, the most heavily used MEE cache line can be picked as the replacement candidate. In practice, the MEE may select a replacement candidate that is the most-recently used line in the cache set where, for example, the last metadata chunk in a MEE cache line was accessed last and a replacement is needed on the next cache access. In another example, the MEE may select a replacement candidate that is not the most-recently used line. This can happen, for example, if the MEE cache line selected as a replacement candidate has more MUB bits sets than the MEE cache line that was last accessed. This demonstrates that the MUB replacement policy picks replacement candidates based on usage as opposed to the temporal characteristics of cache line accesses. In some situations, however, selecting the MEE cache line with the most bits set can hurt performance. This can happen if, for example, the MEE cache line that is picked for a replacement candidate is currently being used.

Figure 5A:
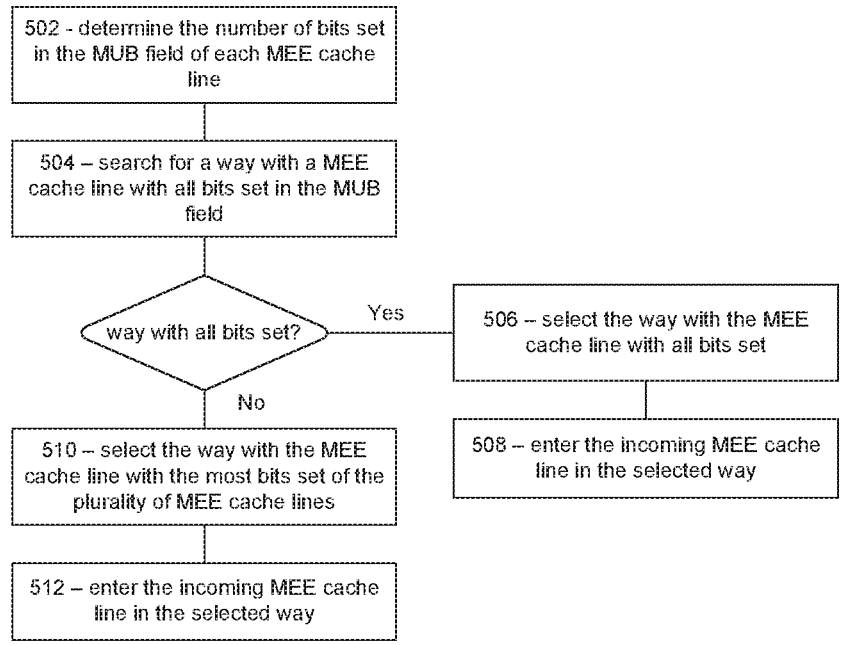
FIG. 5a is a schematic illustration of a MEE cache replacement policy in accordance with an example embodiment.

FIG. 5a illustrates one example of such a replacement policy flow, in which the MEE looks up the vector bit for the MUB field of each MEE cache line to 502 determine the number of bits set in each cache line, and then 504 searches for a way having a MEE cache line bit vector with all of the bits set. If the MEE finds a way holding a bit vector with all bits set, 506 the way is selected, the associated MEE cache line is the replacement candidate, and 508 the incoming MEE cache line is entered into the selected way of the MEE cache. If the MEE does not find a way holding a bit vector with all bits set, 510 a way is selected holding a bit vector having the most bits set of the plurality of MEE cache lines, and 512 the incoming MEE cache line is entered into the selected way (i.e., the placement way) of the MEE cache. Any dirty metadata in the MEE cache line evicted from the selected way is written back to memory as part of the protected region.

In a second option to address the situation where a MEE cache line cannot be found having all MUB bits set, the replacement policy can default to picking the replacement candidate based on the LRU MEE cache line. This option thus ensures that, for situations where a line having all bits set cannot be found, the MUB replacement policy will never perform worse than the LRU replacement policy.

Figure 5B:
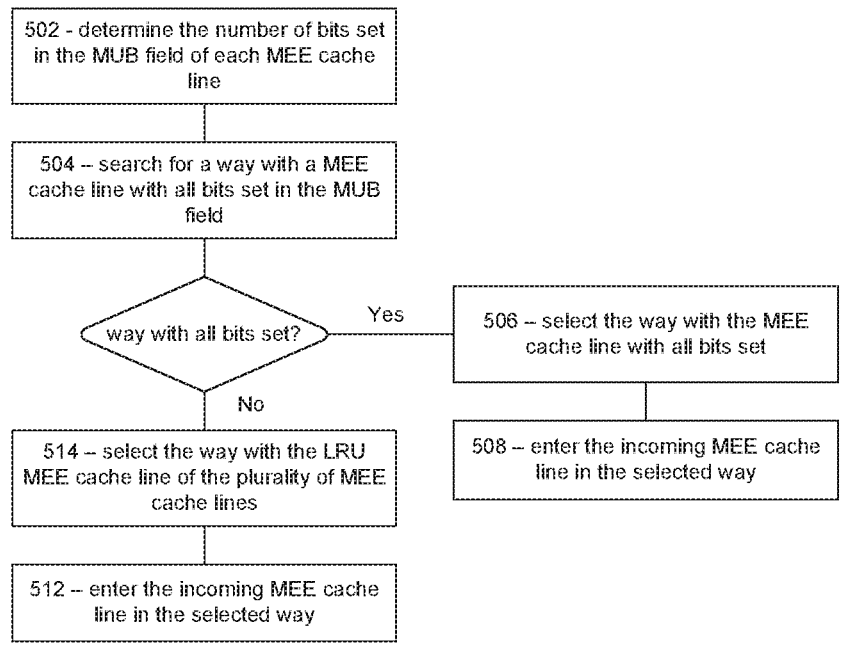
FIG. 5b is a schematic illustration of a MEE cache replacement policy in accordance with an example embodiment.

FIG. 5b illustrates an example of such a replacement policy flow, in which the MEE looks up the vector bit for the MUB field of each MEE cache line to 502 determine the number of bits set in each cache line, and then 504 searches for a way having a MEE cache line bit vector with all of the bits set. If the MEE finds a way holding a bit vector with all bits set, 506 the way is selected, the associated MEE cache line is the replacement candidate, and 508 the incoming MEE cache line is entered into the selected way of the MEE cache. If the MEE does not find a way holding a bit vector with all bits set, 514 a way is selected holding the LRU MEE cache line of the plurality of MEE cache lines, and 512 the incoming MEE cache line is entered into the selected way of the MEE cache. Any dirty metadata in the MEE cache line evicted from the selected way is written back to memory as part of the protected region.

Figure 6:
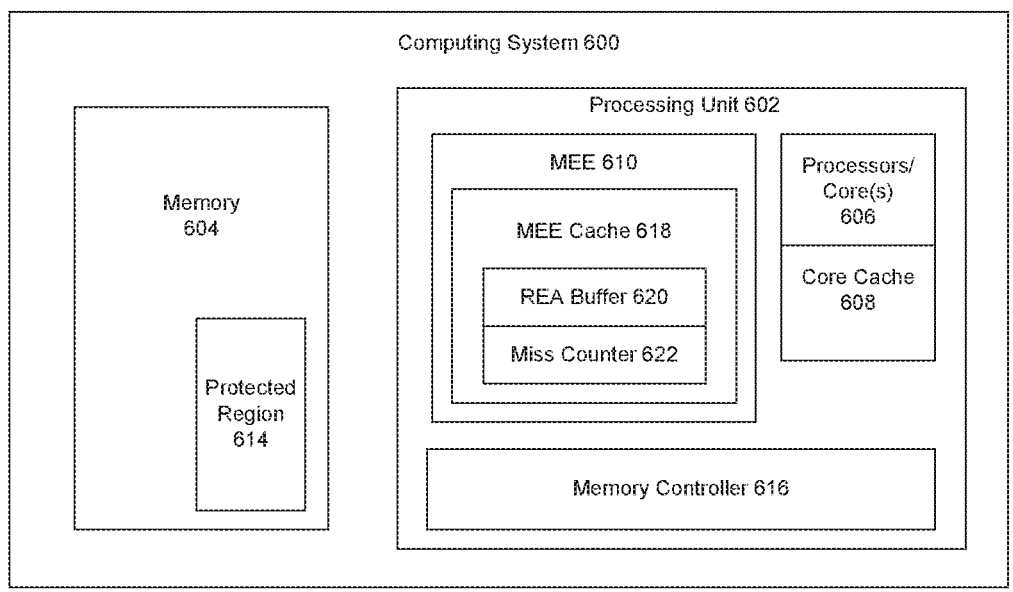
FIG. 6 is a block diagram of a computing system in accordance with an example embodiment.

In another example implementation, the replacement policy implemented can be a hybrid of the "greatest number of bits set" replacement policy and the LRU replacement policy. FIG. 6 illustrates one example of a computing system 600 for accomplishing such a hybrid replacement policy, which includes a processing unit 602 communicatively coupled to a memory 604. In one example, the processing unit 602 is contained on a processor die. The processing unit 602 can include one or more processors and/or processor cores 606, and a core cache 608 to cache data and instructions that are frequently used by the processor core 606. The processor core 606 executes instructions and performs operations on data, which can be moved to and from the memory 604. In some example, the core cache 608 can include various prioritized cache levels, which in one example can include, without limitation, a level 1 (L1), a level 2 (L2), and a level 3 (L3) cache. The processing unit 602 also includes a memory controller 616 to provide data and command communication between the processor core 606 and the memory 604.

The processing unit 602 also includes a MEE 610 for performing encryption operations on plaintext before it leaves the processing unit 602 to be stored in a protected region 614 of the memory 604, and decryption operations on ciphertext arriving at the processing unit 602 from the protected region 614. Additionally, the MEE 610 authenticates incoming ciphertext to ensure integrity confidentiality. The MEE 610 further includes a MEE cache 618 for caching cryptographic metadata associated with ciphertext data lines stored in the protected region 614 of the memory 604. The MEE cache 618 further includes a recently evicted address (REA) buffer 620 for storing the most recently evicted addresses from the MEE cache 618. It is noted that the REA buffer 620 is different from a victim cache, where evicted data blocks are stored following eviction before moving to a different cache level. In this case, the REA buffer 620 is only storing the history of the most recently evicted addresses, and not the metadata blocks themselves. The REA buffer 620 can be of any useful size, depending on computing system needs, the proportion of protected data used by a computing system, and the like. In one example, the REA buffer 620 can be a small 4-8 entry buffer for many computing systems. The MEE cache 618 can also include a miss counter 622 that tracks the number of real misses from MEE cache lookups that would have been hits if the MEE cache lines associated with the addresses in the REA buffer 620 had not been evicted from the MEE cache. In other words, the miss counter 622 includes a counter for each entry in the REA buffer 620 that update every time a MEE cache lookup returns a miss for the address in the associated entry. If an entry is pushed off the REA buffer 620, the counter of the miss counter 622 associated with that entry is reset, and begins counting MEE cache misses for the new address in the entry.

Figure 7:
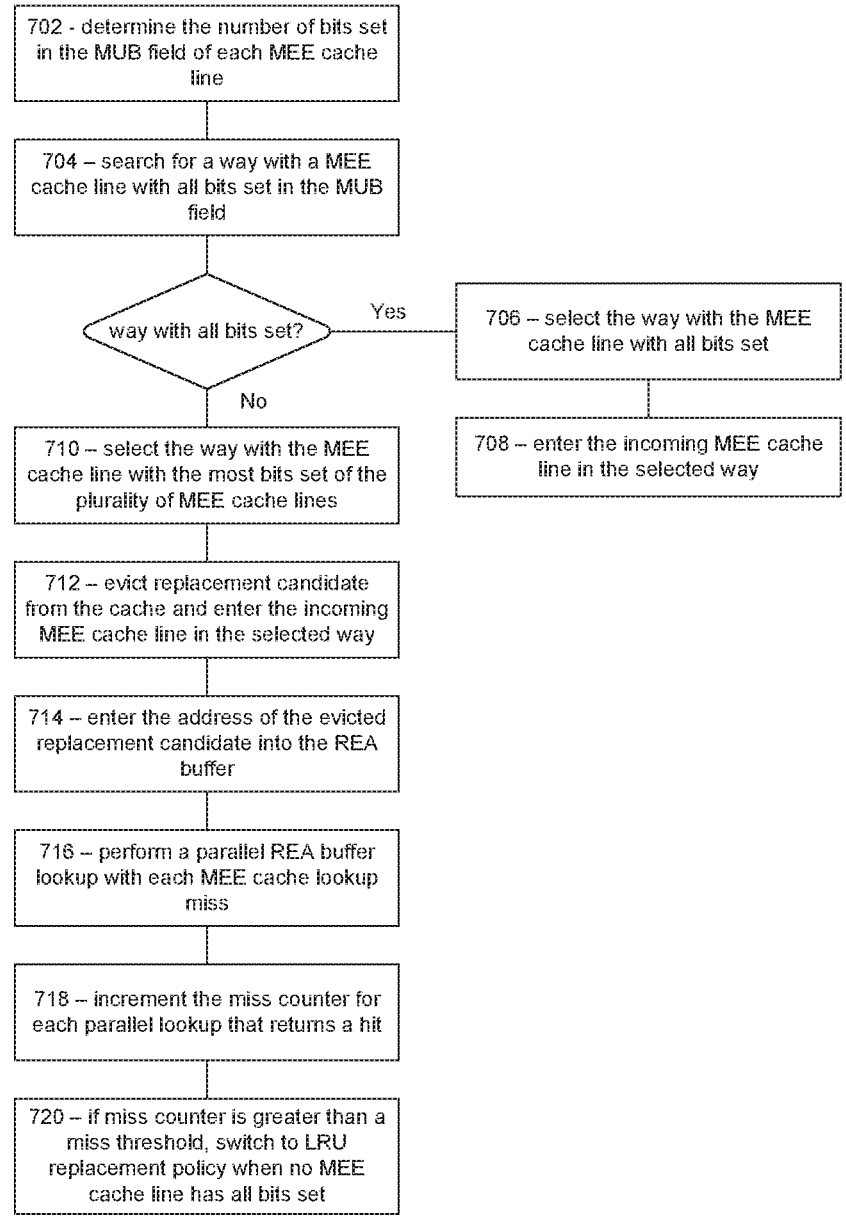
FIG. 7 is a schematic illustration of a MEE cache replacement policy in accordance with an example embodiment.

FIG. 7 illustrates an example of such a hybrid replacement policy flow, in which the MEE looks up the vector bit for the MUB field of each MEE cache line to 702 determine the number of bits set in each cache line, and then 704 searches for a way having a MEE cache line bit vector with all of the bits set. If the MEE finds a way holding a bit vector with all bits set, 706 the way is selected, the associated MEE cache line is the replacement candidate, and 708 the incoming MEE cache line is entered into the selected way of the MEE cache. If the MEE does not find a way holding a bit vector with all bits set, 710 a way is selected holding a bit vector having the most bits set of the plurality of MEE cache lines, and the MEE cache line in the selected way becomes the replacement candidate. The 712 replacement candidate is evicted from the cache, and the incoming MEE cache line is entered into the selected way. Any dirty metadata in the MEE cache line evicted from the selected way is written back to memory as part of the protected region. The 714 address of the evicted replacement candidate is entered into the REA buffer, and 716 a parallel lookup of the REA buffer is performed at least with every MEE cache lookup miss. If the parallel lookup of the REA buffer results in a hit on the evicted address, 718 the associated miss counter is incremented. If 720 the miss counter increases beyond a miss threshold, the MEE cache defaults to selecting the LRU MEE cache line if there is no cache line with all bits set in the bit vector. The threshold can be set based on the specifics of a given system, and is not considered to be limiting.

In one example embodiment, a power-optimized MEE is provided. Power optimization can be important for a number of device configurations, and in a number of device operation scenarios, such as power use impacting on battery life, inactivity-related power down operations, inactivity-related sleep states, and the like. The behavior of the MEE and MEE cache can have an impact on many such operation scenarios, and as such, can be optimized to improve their implementation. For example, a mobile device can be powered down due to inactivity or placed into a sleep state to conserve on battery power, and woken up again as a result of upstream traffic or other activity. The power flows in such devices are important, as they can directly impact battery life, particularly in mobile devices. In such cases, it can be beneficial to enter and exit these power flows as quickly as possible. MEE processes can have an impact, as the MEE cache needs to be flushed and written back to memory prior to exiting the power flows. As such, in one example the MEE can identify MEE cache lines having all of the MUB field bits set, indicating that the associated metadata has served its purpose and is no longer needed by the MEE. Once identified, the MEE can proactively set the identified MEE cache line to invalid, set the cache way holding the MEE cache line as empty, and write back any dirty data or metadata back to memory. In this manner, the proactive flushing of MEE cache lines having all bits set from the MEE cache reduces the number of lines that need to be flushed on a power-down or sleep operation, thus speeding up the operation and increasing power savings.

Figure 8:
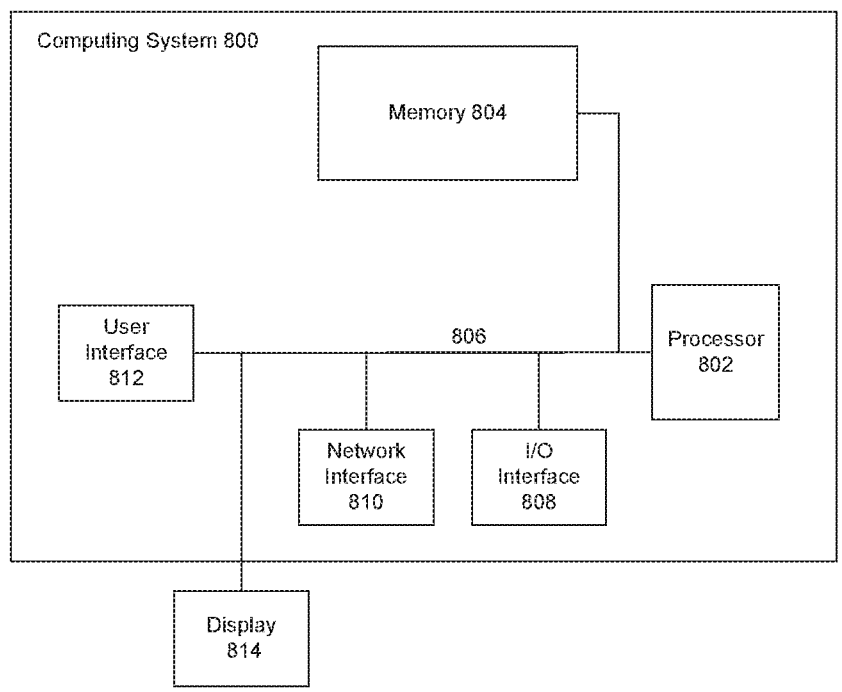
FIG. 8 is a schematic illustration of a computing system in accordance with an example embodiment.

FIG. 8 illustrates an example of a general computing system or device 800 that can be employed in the present technology, in some examples as a host system. While any type or configuration of device or computing system is contemplated to be within the present scope, non-limiting examples can include self-contained computer systems, node computing systems, System on a Chip (SoC) systems, server systems, networking systems, storage systems, high capacity memory systems, or the like. The computing system 800 can include one or more processors 802 in communication with a memory 804. The memory 804 can include any device, combination of devices, circuitry, or the like, that is capable of storing, accessing, organizing, and/or retrieving data. Additionally, a communication interface 806, such as a local communication interface, for example, provides connectivity between the various components of the system. For example, the communication interface 806 can be a local data bus and/or any related address or control busses as may be useful.

The computing system 800 can also include an I/O (input/output) interface 808 for controlling the I/O functions of the system, as well as for I/O connectivity to devices outside of the computing system 800. A network interface 810 can also be included for network connectivity. The network interface 810 can control network communications both within the system and outside of the system, and can include a wired interface, a wireless interface, a Bluetooth interface, optical interface, communication fabric, and the like, including appropriate combinations thereof. Furthermore, the computing system 800 can additionally include a user interface 812, a display device 814, as well as various other components that would be beneficial for such a system.

The processor 802 can be a single or multiple processors, including single or multiple processor cores, and the memory can be a single or multiple memories. The local communication interface can be used as a pathway to facilitate communication between any of a single processor or processor cores, multiple processors or processor cores, a single memory, multiple memories, the various interfaces, and the like, in any useful combination.

The memory 804 can include a memory with volatile memory, nonvolatile memory (NVM), or a combination thereof. Volatile memory is a storage medium that requires power to maintain the state of data stored by the medium. Exemplary memory can include any combination of random access memory (RAM), such as static random access memory (SRAM), dynamic random access memory (DRAM), synchronous dynamic random access memory (SDRAM), and the like. In some examples, DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org).

NVM is a storage medium that does not require power to maintain the state of data stored by the medium. Nonlimiting examples of NVM can include any or a combination of solid state memory (such as planar or three-dimensional (3D) NAND flash memory, NOR flash memory, or the like), cross point array memory, including 3D cross point memory, phase change memory (PCM), such as chalcogenide PCM, non-volatile dual in-line memory module (NVDIMM), a network attached storage, byte addressable nonvolatile memory, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, spin transfer torque (STT) memory, nanowire memory, electrically erasable programmable read-only memory (EEPROM), magnetic storage memory, write in place non-volatile MRAM (NVM-RAM), and the like. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data.

EXAMPLES

The following examples pertain to specific embodiments and point out specific features, elements, or steps that can be used or otherwise combined in achieving such embodiments.

In one example, there is provided an electronic device, comprising a memory encryption engine (MEE) coupleable to one or more processor cores, and further comprising a MEE cache configured to store a plurality of MEE cache lines, each MEE cache line comprising a plurality of cryptographic metadata blocks, where each metadata block is associated with each of a plurality of encrypted data lines stored in a memory, and each MEE cache line includes a bit vector mapped to the plurality of metadata blocks, where a set bit in the bit vector indicates that the associated metadata block has been accessed by the one or more processors, and the MEE further comprises MEE circuitry configured to select a replacement candidate from the plurality of MEE cache lines for eviction from the MEE cache based on a number of accessed metadata blocks in the replacement candidate as indicated by the associated bit vector.

In one example of an electronic device, in selecting the replacement candidate, the MEE circuitry is further configured to determine a number of set bits in each bit vector of the plurality of MEE cache lines, and search for a MEE cache line having a bit vector with all bits set.

In one example of an electronic device, in response to finding a MEE cache line with a bit vector having all bits set, the MEE circuitry is further configured to select the MEE cache line with the bit vector having all bits set as the replacement candidate.

In one example of an electronic device, in response to not finding a MEE cache line with a bit vector having all bits set, the MEE circuitry is further configured to select as the replacement candidate, a MEE cache line from the plurality of MEE cache lines having the greatest number of bits set in the associated bit vector.

In one example of an electronic device, in response to not finding a MEE cache line with a bit vector having all bits set, the MEE circuitry is further configured to select as the replacement candidate, a least recently used (LRU) MEE cache line from the plurality of MEE cache lines.

In one example of an electronic device, wherein the MEE cache further comprises a recently evicted address (REA) buffer having a plurality of entries for storing a plurality of memory addresses, and a miss counter associated with each of the pluralities of entries of the REA buffer.

In one example of an electronic device, in response to finding a MEE cache line with a bit vector having all bits set, the MEE circuitry is further configured to select the MEE cache line with the bit vector having all bits set as the replacement candidate.

In one example of an electronic device, in response to not finding a MEE cache line with a bit vector having all bits set, the MEE circuitry is further configured to select as the replacement candidate, a MEE cache line from the plurality of MEE cache lines having the greatest number of bits set in the associated bit vector, evict the replacement candidate from the MEE cache, enter a memory address for the replacement candidate into the REA buffer, perform a lookup of the REA buffer for a hit on the memory address of the replacement candidate whenever a MEE cache lookup returns a miss, increment the miss counter each time the lookup of the REA buffer returns a hit, and select as a replacement candidate, on a next eviction from the MEE cache, a least recently used (LRU) MEE cache line if the miss counter is greater than or equal to a threshold number of returned misses.

In one example of an electronic device, wherein the MEE circuitry is further configured to determine a number of set bits in each bit vector of the plurality of MEE cache lines, search for a MEE cache line having a bit vector with all bits set, invalidate the MEE cache line, and set a MEE cache way holding invalidated MEE cache line to an empty way.

In one example of an electronic device, the number of accessed metadata blocks in the replacement candidate is all of the metadata blocks in the replacement candidate.

In one example of an electronic device, the number of accessed metadata blocks in the replacement candidate is a greatest number of the metadata blocks in a MEE cache line of the plurality of MEE cache lines.

In one example, there is provided a computing system comprising one or more processor cores, a memory controller coupled to the one or more processor cores, a memory encryption engine (MEE) coupled to the one or more processor cores and to the memory controller, and further comprising a MEE cache configured to store a plurality of MEE cache lines, each MEE cache line comprising a plurality of cryptographic metadata blocks, where each metadata block is associated with each of a plurality of encrypted data lines stored in a memory, and each MEE cache line includes a bit vector mapped to the plurality of metadata blocks, where a set bit in the bit vector indicates that the associated metadata block has been accessed by the one or more processors, and MEE circuitry configured to select a replacement candidate from the plurality of MEE cache lines for eviction from the MEE cache based on a number of accessed metadata blocks in the replacement candidate as indicated by the associated bit vector.

In one example of a computing system, in selecting the replacement candidate, the MEE circuitry is further configured to determine a number of set bits in each bit vector of the plurality of MEE cache lines, and search for a MEE cache line having a bit vector with all bits set.

In one example of a computing system, in response to finding a MEE cache line with a bit vector having all bits set, the MEE circuitry is further configured to select the MEE cache line with the bit vector having all bits set as the replacement candidate.

In one example of a computing system, in response to not finding a MEE cache line with a bit vector having all bits set, the MEE circuitry is further configured to select as the replacement candidate, a MEE cache line from the plurality of MEE cache lines having the greatest number of bits set in the associated bit vector.

In one example of a computing system, in response to not finding a MEE cache line with a bit vector having all bits set, the MEE circuitry is further configured to select as the replacement candidate, a least recently used (LRU) MEE cache line from the plurality of MEE cache lines.

In one example of a computing system, wherein the MEE cache further comprises a recently evicted address (REA) buffer having a plurality of entries for storing a plurality of memory addresses, and a miss counter associated with each of the pluralities of entries of the REA buffer.

In one example of a computing system, in response to finding a MEE cache line with a bit vector having all bits set, the MEE circuitry is further configured to select the MEE cache line with the bit vector having all bits set as the replacement candidate.

In one example of a computing system, in response to not finding a MEE cache line with a bit vector having all bits set, the MEE circuitry is further configured to select as the replacement candidate, a MEE cache line from the plurality of MEE cache lines having the greatest number of bits set in the associated bit vector, evict the replacement candidate from the MEE cache, enter a memory address for the replacement candidate into the REA buffer, perform a lookup of the REA buffer for a hit on the memory address of the replacement candidate whenever a MEE cache lookup returns a miss, increment the miss counter each time the lookup of the REA buffer returns a hit, and select as a replacement candidate, on a next eviction from the MEE cache, a least recently used (LRU) MEE cache line if the miss counter is greater than or equal to a threshold number of returned misses.

In one example of a computing system, wherein the MEE circuitry is further configured to determine a number of set bits in each bit vector of the plurality of MEE cache lines, search for a MEE cache line having a bit vector with all bits set, invalidate the MEE cache line, and set a MEE cache way holding invalidated MEE cache line to an empty way.

In one example of a computing system, the number of accessed metadata blocks in the replacement candidate is all of the metadata blocks in the replacement candidate.

In one example of a computing system, the number of accessed metadata blocks in the replacement candidate is a greatest number of the metadata blocks in a MEE cache line of the plurality of MEE cache lines.

In one example, there is provided a computer-implemented method comprising receiving, in a memory encryption engine (MEE), a MEE cache line for entry into a MEE cache of the MEE, where the MEE cache does not include an empty way, and the MEE cache line comprises a plurality of cryptographic metadata blocks, where each metadata block is associated with each of a plurality of encrypted data lines stored in a memory, and the MEE cache line includes a bit vector mapped to the plurality of metadata blocks, where a set bit in the bit vector indicates that the associated metadata block has been accessed by one or more processors, and selecting a replacement candidate for eviction from the MEE cache, using the MEE, from a plurality of MEE cache lines in the MEE cache, where the selection is based on a number of accessed metadata blocks in the replacement candidate as indicated by the associated bit vector.

In one example of a computer-implemented method, when selecting the replacement candidate, further comprises determining a number of set bits in each bit vector of the plurality of MEE cache lines, and searching for a MEE cache line having a bit vector with all bits set.

In one example of a computer-implemented method, when finding a MEE cache line with a bit vector having all bits set, further comprises selecting the MEE cache line with the bit vector having all bits set as the replacement candidate.

In one example of a computer-implemented method, when not finding a MEE cache line with a bit vector having all bits set, further comprises selecting as the replacement candidate, a MEE cache line from the plurality of MEE cache lines having the greatest number of bits set in the associated bit vector.

In one example of a computer-implemented method, when not finding a MEE cache line with a bit vector having all bits set, further comprises selecting as the replacement candidate, a least recently used (LRU) MEE cache line from the plurality of MEE cache lines.

In one example of a computer-implemented method, when not finding a MEE cache line with a bit vector having all bits set, further comprises selecting as the replacement candidate, a MEE cache line from the plurality of MEE cache lines having the greatest number of bits set in the associated bit vector, evicting the replacement candidate from the MEE cache, entering a memory address of the replacement candidate to a recently evicted address (REA) buffer, incrementing a miss counter associated with the replacement candidate address for each MEE cache miss that is a REA buffer hit for the replacement candidate address, and selecting a least recently used (LRU) MEE cache line for a subsequent replacement candidate if the miss counter exceeds a threshold.

In one example of a computer-implemented method, further comprising determining a number of set bits in each bit vector of the plurality of MEE cache lines, searching for a MEE cache line having a bit vector with all bits set, invalidating the MEE cache line, and setting a MEE cache way holding invalidated MEE cache line to an empty cache way.

In one example of a computer-implemented method, the number of accessed metadata blocks in the replacement candidate is all of the metadata blocks in the replacement candidate.

In one example of a computer-implemented method, the number of accessed metadata blocks in the replacement candidate is a greatest number of the metadata blocks in a MEE cache line of the plurality of MEE cache lines.

The invention claimed is:

1. An electronic device, comprising:
   a memory encryption engine (MEE) coupleable to one or more processor cores, and further comprising:
   a MEE cache configured to store a plurality of MEE cache lines, each MEE cache line comprising a plurality of cryptographic metadata blocks, where each cryptographic metadata block is associated with each of a plurality of encrypted data lines stored in a memory, and each MEE cache line includes a bit vector mapped to the plurality of cryptographic metadata blocks, where a set bit in the bit vector indicates that the associated cryptographic metadata block has been accessed by the one or more processor cores; and MEE circuitry configured to:
select a replacement candidate from the plurality of MEE cache lines for eviction from the MEE cache based on a number of accessed cryptographic metadata blocks in the replacement candidate as indicated by the associated bit vector.

2. The electronic device of claim 1, wherein, in selecting the replacement candidate, the MEE circuitry is further configured to:
determine a number of set bits in each bit vector of the plurality of MEE cache lines;
search for a MEE cache line having a bit vector with all bits set; and
in response to finding a MEE cache line with a bit vector having all bits set, select the MEE cache line with the bit vector having all bits set as the replacement candidate.

3. The electronic device of claim 2, wherein, in response to not finding a MEE cache line with a bit vector having all bits set, the MEE circuitry is further configured to:
select as the replacement candidate, a MEE cache line from the plurality of MEE cache lines having the greatest number of bits set in the associated bit vector.

4. The electronic device of claim 2, wherein, in response to not finding a MEE cache line with a bit vector having all bits set, the MEE circuitry is further configured to:
select as the replacement candidate, a least recently used (LRU) MEE cache line from the plurality of MEE cache lines.

5. The electronic device of claim 2, wherein the MEE cache further comprises:
a recently evicted address (REA) buffer having a plurality of entries for storing a plurality of memory addresses;
a miss counter associated with each of the plurality of entries of the REA buffer;
and, in response to finding a MEE cache line with a bit vector having all bits set, the MEE circuitry is further configured to:
select the MEE cache line with the bit vector having all bits set as the replacement candidate.

6. The electronic device of claim 5, wherein, in response to not finding a MEE cache line with a bit vector having all bits set, the MEE circuitry is further configured to:
select as the replacement candidate, a MEE cache line from the plurality of MEE cache lines having the greatest number of bits set in the associated bit vector;
evict the replacement candidate from the MEE cache;
enter a memory address for the replacement candidate into the REA buffer;
perform a lookup of the REA buffer for a hit on the memory address of the replacement candidate whenever a MEE cache lookup returns a miss;
increment the miss counter each time the lookup of the REA buffer returns a hit; and
select as a replacement candidate, on a next eviction from the MEE cache, a least recently used (LRU) MEE cache line if the miss counter is greater than or equal to a threshold number of returned misses.

7. The electronic device of claim 1, wherein the MEE circuitry is further configured to:
determine a number of set bits in each bit vector of the plurality of MEE cache lines;
search for a MEE cache line having a bit vector with all bits set;

invalidate the MEE cache line; and
set a MEE cache way holding invalidated MEE cache line to an empty way.

8. The electronic device of claim 1, wherein the number of accessed cryptographic metadata blocks in the replacement candidate is all of the cryptographic metadata blocks in the replacement candidate.

9. The electronic device of claim 1, wherein the number of accessed cryptographic metadata blocks in the replacement candidate is a greatest number of the cryptographic metadata blocks in a MEE cache line of the plurality of MEE cache lines.

10. A computing system, comprising:
one or more processor cores;
a memory controller coupled to the one or more processor cores;
a memory encryption engine (MEE) coupled to the one or more processor cores and to the memory controller, and further comprising:
a MEE cache configured to store a plurality of MEE cache lines, each MEE cache line comprising a plurality of cryptographic metadata blocks, where each cryptographic metadata block is associated with each of a plurality of encrypted data lines stored in a memory, and each MEE cache line includes a bit vector mapped to the plurality of cryptographic metadata blocks, where a set bit in the bit vector indicates that the associated cryptographic metadata block has been accessed by the one or more processors cores; and
MEE circuitry configured to:
select a replacement candidate from the plurality of MEE cache lines for eviction from the MEE cache based on a number of accessed cryptographic metadata blocks in the replacement candidate as indicated by the associated bit vector.

11. The computing system of claim 10, wherein, in selecting the replacement candidate, the MEE circuitry is further configured to:
determine a number of set bits in each bit vector of the plurality of MEE cache lines;
search for a MEE cache line having a bit vector with all bits set; and
in response to finding a MEE cache line with a bit vector having all bits set, select the MEE cache line with the bit vector having all bits set as the replacement candidate.

12. The computing system of claim 11, wherein, in response to not finding a MEE cache line with a bit vector having all bits set, the MEE circuitry is further configured to:
select as the replacement candidate, a MEE cache line from the plurality of MEE cache lines having the greatest number of bits set in the associated bit vector.

13. The computing system of claim 11, wherein, in response to not finding a MEE cache line with a bit vector having all bits set, the MEE circuitry is further configured to:
select as the replacement candidate, a least recently used (LRU) MEE cache line from the plurality of MEE cache lines.

14. The computing system of claim 11, wherein the MEE cache further comprises:
a recently evicted address (REA) buffer having a plurality of entries for storing a plurality of memory addresses;
a miss counter associated with each of the plurality of entries of the REA buffer;

and, in response to finding a MEE cache line with a bit vector having all bits set, the MEE circuitry is further configured to:
    select the MEE cache line with the bit vector having all bits set as the replacement candidate.

15. The computing system of claim 14, wherein, in response to not finding a MEE cache line with a bit vector having all bits set, the MEE circuitry is further configured to:
    select as the replacement candidate, a MEE cache line from the plurality of MEE cache lines having the greatest number of bits set in the associated bit vector;
    evict the replacement candidate from the MEE cache;
    enter a memory address for the replacement candidate into the REA buffer;
    perform a lookup of the REA buffer for a hit on the memory address of the replacement candidate whenever a MEE cache lookup returns a miss;
    increment the miss counter each time the lookup of the REA buffer returns a hit; and
    select as a replacement candidate, on a next eviction from the MEE cache, a least recently used (LRU) MEE cache line if the miss counter is greater than or equal to a threshold number of returned misses.

16. The computing system of claim 10, wherein the MEE circuitry is further configured to:
    determine a number of set bits in each bit vector of the plurality of MEE cache lines;
    search for a MEE cache line having a bit vector with all bits set;
    invalidate the MEE cache line; and
    set a MEE cache way holding invalidated MEE cache line to an empty way.

17. The computing system of claim 10, wherein the number of accessed cryptographic metadata blocks in the replacement candidate is all of the cryptographic metadata blocks in the replacement candidate.

18. The computing system of claim 10, wherein the number of accessed cryptographic metadata blocks in the replacement candidate is a greatest number of the cryptographic metadata blocks in a MEE cache line of the plurality of MEE cache lines.

19. A computer-implemented method, comprising:
    receiving, in a memory encryption engine (MEE), a MEE cache line for entry into a MEE cache of the MEE, where the MEE cache does not include an empty way, and the MEE cache line comprises a plurality of cryptographic metadata blocks, where each cryptographic metadata block is associated with each of a plurality of encrypted data lines stored in a memory, and the MEE cache line includes a bit vector mapped to the plurality of cryptographic metadata blocks, where a set bit in the bit vector indicates that the associated cryptographic metadata block has been accessed by one or more processors; and
    selecting a replacement candidate for eviction from the MEE cache, using the MEE, from a plurality of MEE cache lines in the MEE cache, where the selection is based on a number of accessed cryptographic metadata blocks in the replacement candidate as indicated by the associated bit vector.

20. The computer-implemented method of claim 19, when selecting the replacement candidate, further comprises:
    determining a number of set bits in each bit vector of the plurality of MEE cache lines;
    searching for a MEE cache line having a bit vector with all bits set;
    and, in response to finding a MEE cache line with a bit vector having all bits set, selecting the MEE cache line with the bit vector having all bits set as the replacement candidate.

21. The computer-implemented method of claim 20, when not finding a MEE cache line with a bit vector having all bits set, further comprises:
    selecting as the replacement candidate, a MEE cache line from the plurality of MEE cache lines having the greatest number of bits set in the associated bit vector.

22. The computer-implemented method of claim 20, when not finding a MEE cache line with a bit vector having all bits set, further comprises:
    selecting as the replacement candidate, a least recently used (LRU) MEE cache line from the plurality of MEE cache lines.

23. The computer-implemented method of claim 20, when not finding a MEE cache line with a bit vector having all bits set, further comprises:
    selecting as the replacement candidate, a MEE cache line from the plurality of MEE cache lines having the greatest number of bits set in the associated bit vector;
    evicting the replacement candidate from the MEE cache;
    entering a memory address of the replacement candidate to a recently evicted address (REA) buffer;
    incrementing a miss counter associated with the memory address of the replacement candidate for each MEE cache miss that is a REA buffer hit for the memory address of the replacement candidate; and
    selecting a least recently used (LRU) MEE cache line for a subsequent replacement candidate if the miss counter exceeds a threshold.

24. The computer-implemented method of claim 19, further comprising:
    determining a number of set bits in each bit vector of the plurality of MEE cache lines;
    searching for a MEE cache line having a bit vector with all bits set;
    invalidating the MEE cache line; and
    setting a MEE cache way holding invalidated MEE cache line to an empty cache way.

25. The computer-implemented method of claim 19, wherein the number of accessed cryptographic metadata blocks in the replacement candidate is all of the cryptographic metadata blocks in the replacement candidate.

26. The computer-implemented method of claim 19, wherein the number of accessed cryptographic metadata blocks in the replacement candidate is a greatest number of the cryptographic metadata blocks in a MEE cache line of the plurality of MEE cache lines.

* * * * *